US008917025B2

(12) United States Patent  (10) Patent No.: US 8,917,025 B2
Park et al.  (45) Date of Patent: Dec. 23, 2014

(54) LIGHT EMITTING DIODE DRIVING APPARATUS

(75) Inventors: Deuk Hee Park, Gyeonggi-do (KR); Yun Joong Lee, Seoul (KR); Sang Hyun Cha, Seoul (KR); Jae Shin Lee, Gyeonggi-do (KR); Chang Seok Lee, Gyeonggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 229 days.

(21) Appl. No.: 13/605,101

(22) Filed: Sep. 6, 2012

(65) Prior Publication Data

US 2013/0076253 A1  Mar. 28, 2013

(30) Foreign Application Priority Data

Sep. 26, 2011  (KR) .................. 10-2011-0097064

(51) Int. Cl.
*H05B 37/00* (2006.01)
*H05B 33/08* (2006.01)

(52) U.S. Cl.
CPC ........ *H05B 33/0845* (2013.01); *H05B 33/0806* (2013.01)
USPC .......................................... 315/188; 315/193

(58) Field of Classification Search
None
See application file for complete search history.

(56) References Cited

U.S. PATENT DOCUMENTS

| 5,416,387 | A  | * | 5/1995  | Cuk et al. ................. 315/209 R |
| 5,444,728 | A  | * | 8/1995  | Thompson ................ 372/38.02 |
| 5,854,539 | A  | * | 12/1998 | Pace et al. ..................... 315/208 |
| 5,977,720 | A  | * | 11/1999 | Pace et al. .................. 315/169.3 |
| 7,331,426 | B2 | * | 2/2008  | Jahkonen ...................... 187/290 |
| 7,847,486 | B2 | * | 12/2010 | Ng .............................. 315/119 |
| 8,373,346 | B2 | * | 2/2013  | Hoogzaad et al. ......... 315/185 R |
| 8,716,894 | B2 | * | 5/2014  | Uno et al. ....................... 307/77 |
| 2005/0110431 | A1 | * | 5/2005 | Ben-Yaakov ................. 315/291 |
| 2006/0152448 | A1 | * | 7/2006 | Hatanaka et al. .............. 345/68 |
| 2010/0283322 | A1 | * | 11/2010 | Wibben ......................... 307/31 |
| 2011/0148323 | A1 | * | 6/2011 | Yao et al. ...................... 315/295 |
| 2011/0309771 | A1 | * | 12/2011 | Randall ......................... 315/307 |
| 2012/0286578 | A1 | * | 11/2012 | Uno et al. ....................... 307/77 |
| 2013/0154484 | A1 | * | 6/2013 | Xu .............................. 315/122 |
| 2014/0049174 | A1 | * | 2/2014 | Radermacher et al. ... 315/200 R |

FOREIGN PATENT DOCUMENTS

KR  10-2010-0025590  3/2010
KR  10-2011-0087955  8/2011

\* cited by examiner

*Primary Examiner* — Crystal L Hammond

(57) ABSTRACT

Disclosed herein is a light emitting diode (LED) driving apparatus including: at least one energy storages connected in series with each other; a plurality of LEDs each connected in parallel with each of the energy storages; and a switching control unit selectively connecting the at least one energy storages according to a level of applied voltage to charge/discharge voltage in/from the selected energy storages and control driving of the LEDs by the charging/discharging operation. Therefore, it is possible to easily drive the LEDs without a converter.

12 Claims, 8 Drawing Sheets

- PRIOR ART -

VOLTAGE(V)

CURRENT(I)

LIGHT EMITTING DIODE DRIVING APPARATUS

CROSS REFERENCE(S) TO RELATED APPLICATIONS

This application claims the benefit under 35 U.S.C. Section 119 of Korean Patent Application Serial No. 10-2011-0097064, entitled "Light Emitting Diode Driving Apparatus" filed on Sep. 26, 2011, which is hereby incorporated by reference in its entirety into this application.

BACKGROUND OF THE INVENTION

1. Technical Field

The present invention relates to a light emitting diode (LED) driving apparatus, and more particularly, to an LED driving apparatus for driving an LED used as a backlight of a liquid crystal display.

2. Description of the Related Art

Generally, a liquid crystal display has characteristics such as light weight, a thin thickness, low power consumption, and the like, such that application fields thereof have increased. In accordance with this trend, the liquid crystal display has been used in an office automation device, an audio/video device, and the like.

Since the liquid crystal display as described above does not perform self-lighting, it requires a separate light source called a backlight. As this backlight, a light emitting diode (hereinafter, referred to as an 'LED'), a cold cathode fluorescent lamp (CCFL), an external electrode fluorescent lamp (EEFL), or the like, has been used.

Recently, a backlight light source using the LED has been mainly used. The LED backlight light source is environment-friendly and has a high speed response, such that it may be effectively used for a video signal stream.

FIG. 1 is a circuit diagram schematically showing an LED driving apparatus according to the related art.

Referring to FIG. 1, the LED driving apparatus 1 is formed of a direct current (DC)-DC converter 10 including a transformer 12 switching power input from a control circuit 11 to a primary side thereof to induce and output the power to a secondary side thereof, a rectifying diode D1 rectifying voltage output from the secondary side of the transformer 12, and a smoothing capacitor C1 smoothing the rectified voltage.

The LED driving apparatus 1 converts alternate current power applied thereto into DC power by an operation of the DC-DC converter 10 and provides the converted DC power to LEDs D2 to D4, thereby allowing desired current to flow in the LEDs D2 to D4.

However, in the LED driving apparatus according to the related art, the transformer has an advantage in which it electrically separates the primary side and the secondary side from each other; however, the transformer has large volume and a high cost.

In addition, as the smoothing capacitor, a high capacity electrolytic condenser is generally used. However, this high capacity electrolytic condenser has large volume, a high cost, and a lifespan shorter than that of the LED, thereby reducing a lifespan of the LED driving apparatus.

Therefore, in order to solve the above-mentioned problems, a technology for driving an LED without a converter such as a DC-DC converter has been suggested.

SUMMARY OF THE INVENTION

An object of the present invention is to provide a light emitting diode (LED) driving apparatus capable of easily driving LEDs without a converter by connecting each of the LEDs in parallel with a plurality of energy storage connected in series with each other and selectively charging/discharging voltage in/from the energy storages according to a level of applied voltage.

According to an exemplary embodiment of the present invention, there is provided a light emitting diode (LED) driving apparatus including: at least one energy storages connected in series with each other; a plurality of LEDs each connected in parallel with each of the energy storages; and a switching control unit selectively connecting the at least one energy storages according to a level of applied voltage to charge/discharge voltage in/from the selected energy storages and control driving of the LEDs by the charging/discharging operation.

The switching control unit may selectively connect the at least one energy storages according to the level of the applied voltage to selectively charge the voltage in the at least one energy storages.

The switching control unit may selectively connect the at least one energy storages and the LEDs to each other according to the level of the applied voltage to selectively discharge the voltage charged in the at least one energy storages, thereby driving the LEDs.

The switching control unit may include: at least one first switches each connected between one end of each of the energy storages and a ground; and at least one second switches each connected between the other end of each of the energy storages and each of the LEDs.

The switching control unit may further include a controller outputting first and second control signals for selectively operating the first and second switches according to the level of the applied voltage.

The controller may include: a comparator comparing the applied voltage with a preset reference voltage; and a control signal outputter outputting the first and second control signals using the comparison result from the comparator.

In the case in which the energy storages include sequentially arranged first to n-th energy storages and the LEDs include sequentially arranged first and n-th LEDs, when the level of the applied voltage is less than a preset first reference voltage, the switching control unit may connect a first switch corresponding to the first energy storage to charge the voltage in the first energy storage.

In the case in which the energy storages include sequentially arranged first to n-th energy storages and the LEDs include sequentially arranged first and n-th LEDs, when the level of the applied voltage is a preset second reference voltage or more, the switching control unit may connect a first switch corresponding to the n-th energy storage to charge the voltage in the first to n-th energy storages.

When the charging of the voltage in the first energy storage is completed, the switching control unit may connect a second switch corresponding to the first energy storage to discharge the voltage charged in the first energy storage and apply the discharged voltage to the first LED, thereby driving the first LED.

When the charging of the voltage in the first to n-th energy storages is completed, the switching control unit may connect a second switch corresponding to the first to n-th energy storages to discharge the voltages charged in the first to n-th energy storages and apply the discharged voltages to the first to n-th LEDs, thereby driving the first to n-th LEDs.

The first reference voltage may be smaller than the second reference voltage.

The energy storage may be any one of a capacitor, a secondary battery, an ultracapacitor, and a supercapacitor.

DESCRIPTION OF THE PREFERRED EMBODIMENTS

Terms and words used in the present specification and claims are not to be construed as a general or dictionary meaning but are to be construed meaning and concepts meeting the technical ideas of the present invention based on a principle that the inventors can appropriately define the concepts of terms in order to describe their own inventions in best mode.

Therefore, the configurations described in the embodiments and drawings of the present invention are merely most preferable embodiments but do not represent all of the technical spirit of the present invention. Thus, the present invention should be construed as including all the changes, equivalents, and substitutions included in the spirit and scope of the present invention at the time of filing this application.

Hereinafter, exemplary embodiments of the present invention will be described in detail with reference to the accompanying drawings.

Figure 1:
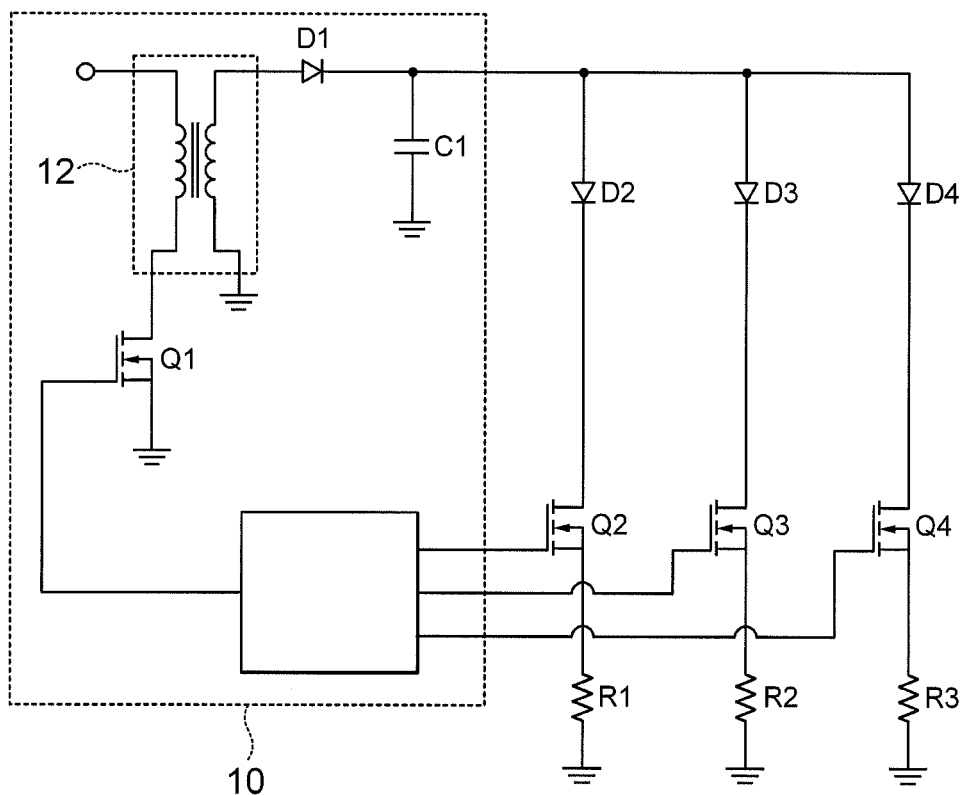
FIG. 1 is a circuit diagram schematically showing an LED driving apparatus according to the related art.
Figure 2:
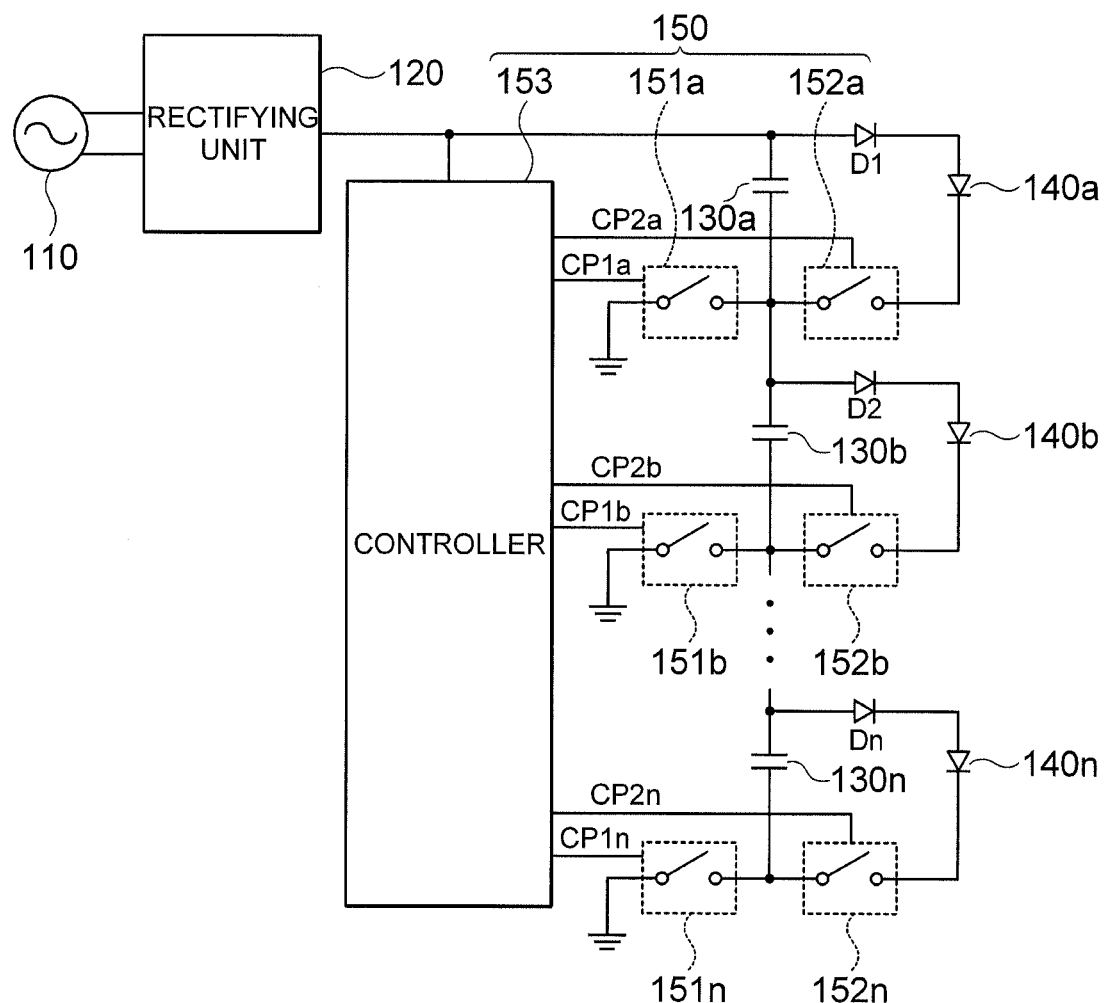
FIG. 2 is a configuration diagram of a light emitting diode (LED) driving apparatus according to an exemplary embodiment of the present invention.
Figure 3:
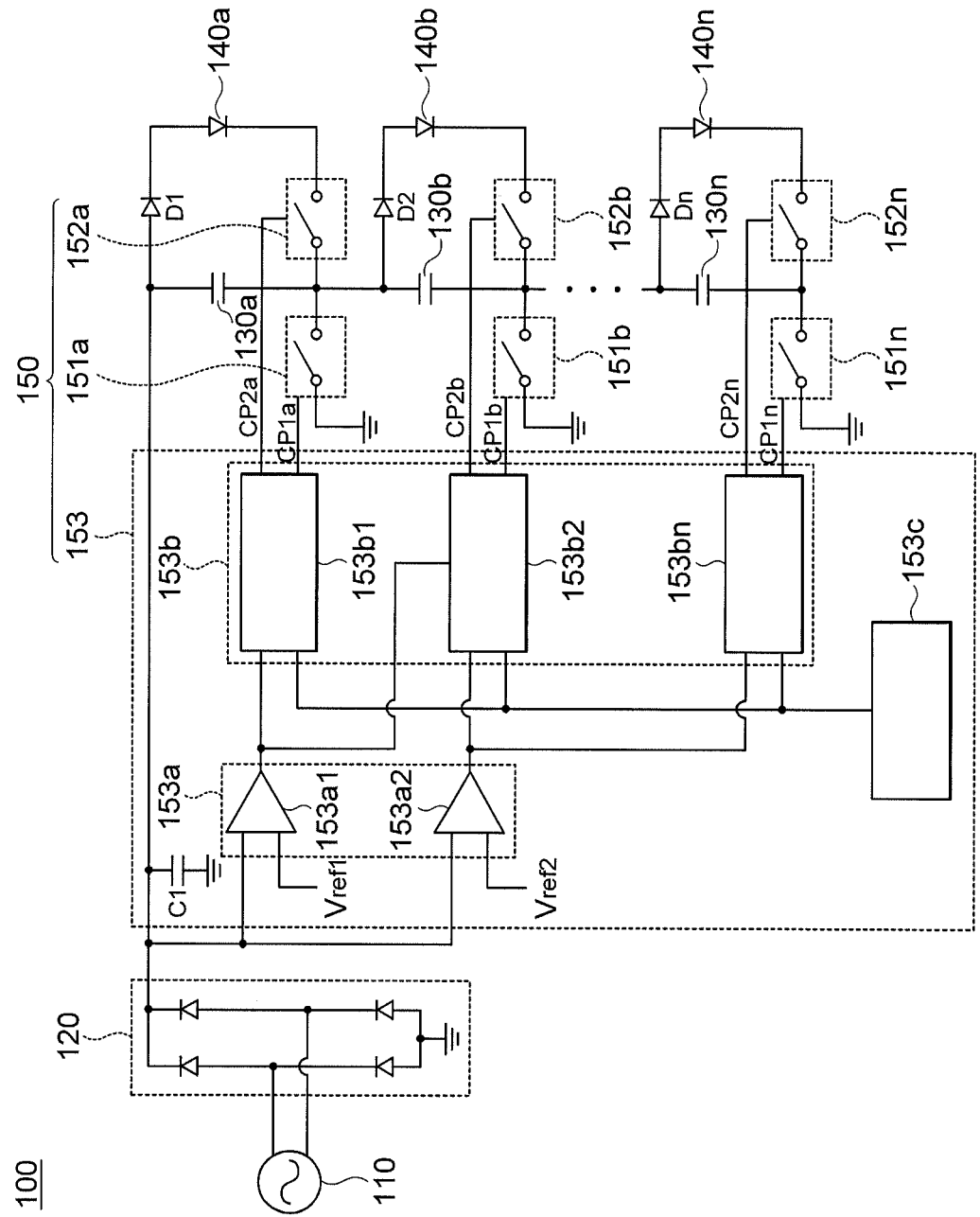
FIG. 3 is a detailed circuit diagram of the LED driving apparatus shown in FIG. 2.

FIG. 2 is a configuration diagram of a light emitting diode (LED) apparatus according to an exemplary embodiment of the present invention; and FIG. 3 is a detailed circuit diagram of the LED driving apparatus shown in FIG. 2.

As shown in FIGS. 2 and 3, the LED driving apparatus 100 is configured to include a power supply 110, a rectifying unit 120, energy storages 130: 130a to 130n, LEDs 140: 140a to 140n, and a switching control unit 150.

Among the above-mentioned components, the rectifying unit 120, which is a unit rectifying alternate current (AC) voltage generated from the power supply 110 to output direct current (DC) voltage in a pulse form, may convert the AC voltage into DC voltage in a full-wave rectified sinusoidal wave form.

The number of energy storages 130: 130a to 130n may be one or more. Generally, a plurality of energy storages are connected in series with each other in order to obtain high voltage. As this energy storage 130, a capacitor, a secondary battery, an ultracapacitor, and a supercapacitor may be used. In addition, other energy storages having characteristics similar to those of the capacitor, the secondary battery, the ultracapacitor, and the supercapacitor may be used.

The number of LEDs 140: 140a to 140b may be one or more, and each of the LEDs may be connected in parallel with each of the energy storages 130a to 130n.

Here, the LED, which is a semiconductor made of gallium (Ga), phosphorus (P), arsenic (As), may have characteristics of a diode. When the LED has current applied thereto, the LED emits light of a red color, a green color, and a yellow color. The LED has a lifespan longer than that of a light bulb and a rapid response speed (here, the response time indicates a time required to emit light after current is applied) and may be manufactured to have various shapes, such that the LED is most appropriate for indicating a peak or a numeral.

The switching control unit 150 selectively connects at least one energy storages 130a to 130n according to a level of applied voltage to charge/discharge voltage in/from the selected energy storages and control driving of the LEDs 140a to 140n by the charging/discharging operation.

More specifically, the switching control unit 150 may selectively connect the energy storages 130a to 130n according to the level of the applied voltage and charge voltage in the selectively connected energy storages 130a to 130n. In addition, the switching control unit 150 selectively connects between the energy storages 130a to 130n and the LEDs 140a to 140n according to the level of the applied voltage to selectively discharge voltage charged in the energy storages 130a to 130n, thereby making it possible to drive the LEDs 140a to 140n.

That is, the switching control unit 150 senses the level of the applied voltage, selects the energy storages 130a to 130n to be charged with the voltage and charges the voltage in the selected energy storages 130a to 130n according to the sensed level of the voltage, and connects the selected energy storages 130a to 130n to corresponding LEDs 140a to 140n when the charging is completed, thereby making it possible to supply the voltage charged in the energy storages 130a to 130n to the LEDs 140a to 140n.

The switching control unit 150 as described above is configured to include first switches 151: 151a to 151n, second switches 152: 152a to 152n, and a controller 153.

Here, the number of first switches 151: 151a to 151n may be one or more, and each of the first switches 151a to 151n may be connected between one end of each of the energy storages 130a to 130n and a ground. When the first switches 151a to 151n are connected (that is, turned on), the voltage may be charged in the energy storages 130a to 130n corresponding to the first switches 151a to 151n.

The number of second switches 152: 152a to 152n may be one or more, and each of the second switches 152a to 152n may be connected between the other end of the energy storages 130a to 130n and each of the LEDs 140a to 140n. When the second switches 152a to 151n are connected (that is, turned on), the voltage is charged from the energy storages 130a to 130n corresponding to the second switches 152a to 151n, such that the voltage may be supplied to the LEDs 140a to 140n.

The controller 153, which is a unit outputting first and second control signals CP1a to CP1n and CP2a to CP2n controlling the first and second switches 151a to 151n and 152a to 152n in order to selectively charge/discharge the voltage in/from the energy storages 130a to 130n according to the level of the applied voltage, may include a comparator 153a, a control signal outputter 153b, and a reference signal outputter 153c.

Among the above-mentioned components, the comparator 153a is configured to compare the applied voltage with a preset reference voltage and output a comparison signal as the comparison result to the control signal outputter 153b, thereby sensing the level of the applied voltage.

The control signal outputter 153b selectively outputs the first and second control signals CP1 to CP2 for controlling the first and second switches 151 and 152 using the comparison result from the comparator 153a, thereby performing a control so that the voltage may be charged or discharged in/from the energy storage.

The reference signal outputter 153c outputs a reference signal for allowing the control signal outputter 153b to selectively output the first and second control signals CP1 and CP2.

Examples of operations of the comparator 153a, the control signal outputter 153b, and the reference signal outputter 153c described above with reference to FIG. 3 will be described. In the case in which the energy storage includes first to third energy storages 130a to 130c and the LED includes first to third LEDs 140a to 140c, the comparator 153a may include first and second comparators 153a1 and 153a2.

Here, the first comparator 153a1 may compare the applied voltage with a preset first reference voltage Vref1 and output a first comparison signal having a high or low level as the comparison result. In addition, the second comparator 153a2 may compare the applied voltage with a preset second reference voltage Vref2 and output a second comparison signal having a high or low level as the comparison result.

Here, the first reference voltage Vref1 is configured to be smaller than the second reference voltage Vref2, such that the first and second comparison signals having the high or low level are output from the first and second comparators 153a1 and 153a2 according to the level of the applied voltage, thereby making it possible to sense the level of the applied voltage.

In addition, the control signal outputter 153b outputs the first and second control signals CP1a to CP1n and CP2a to CP2n using the first and second comparison signals output from the first and second comparators 153a1 and 153a2 so that the voltage may be selectively charged/discharged in/from the energy storages 130a to 130c. This control signal outputter 153b may include an inverter (not shown) inverting levels of the first and second comparison signals output from the first and second comparators 153a1 and 153a2 and a logic operator (not shown) AND-gating the first and second comparison signals output from the first and second comparators 153a1 and 153a2 and a signal output from the inverter.

Due to the operations of the comparison 153a, the control signal outputter 153b, and the reference signal outputter 153c, the controller 153 selectively connects the first and second switches 151a to 151n and 152a to 152n, thereby making it possible to selectively charge/discharge the voltage in/from the energy storages 130a to 130n.

Hereinafter, a switching operation of the switching control unit for charging/discharging the voltage in the energy storage according to the applied voltage will be described in detail.

Figure 4:
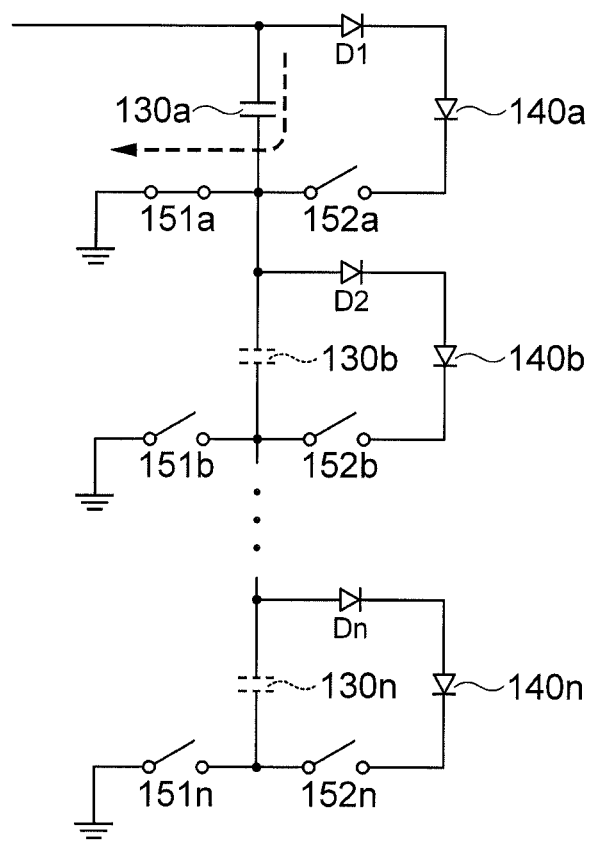
FIG. 4 is a diagram describing a switching operation of a switching control unit for charging voltage in an energy storage in a state in which input voltage is low in the LED driving apparatus shown in FIG. 2.
Figure 5:
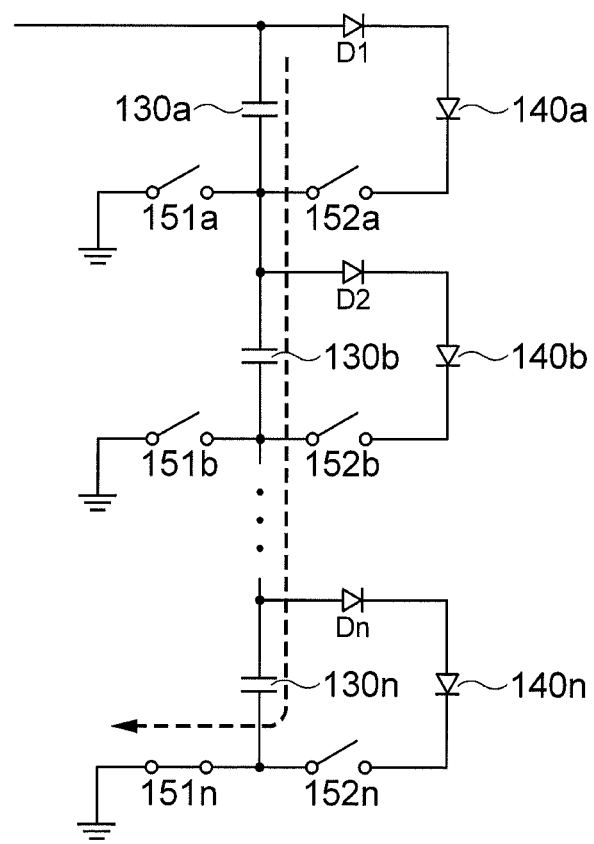
FIG. 5 is a diagram describing a switching operation of the switching control unit for charging the voltage in the energy storage in a state in which the input voltage is high in the LED driving apparatus shown in FIG. 2.

FIG. 4 is a diagram describing a switching operation of a switching control unit for charging voltage in an energy storage in a state in which input voltage is low in the LED driving apparatus shown in FIG. 2; and FIG. 5 is a diagram describing a switching operation of the switching control unit for charging the voltage in the energy storage in a state in which the input voltage is high in the LED driving apparatus shown in FIG. 2.

First referring to FIG. 4, when the applied voltage is 50 V, the first reference voltage is 60 V, and the second reference voltage is 110V, the controller 153 performs a control to output the first control signal CP1a connecting the first switch 151a using the comparator 153a, the control signal outputter 153b, and the reference signal outputter 153c, thereby charging the voltage only in a first energy storage 130a. That is, in a state in which the input voltage is low, the first switch 151a is connected so that the voltage is charged only in the first energy storage 130a positioned at an uppermost portion.

Describing a case of FIG. 5, when the applied voltage is 120V, the first reference voltage is 60 V, and the second reference voltage is 110V, the controller 153 performs a control to output the first control signal CP1n connecting the first switch 151n using the comparator 153a, the control signal outputter 153b, and the reference signal outputter 153c, thereby charging the voltage in all of the first to n-th energy storages 130a to 130n. That is, in a state in which the input voltage is high, the first switch 151n is connected so that the voltage is charged in all of the energy storages 130a to 130n.

Figure 6:
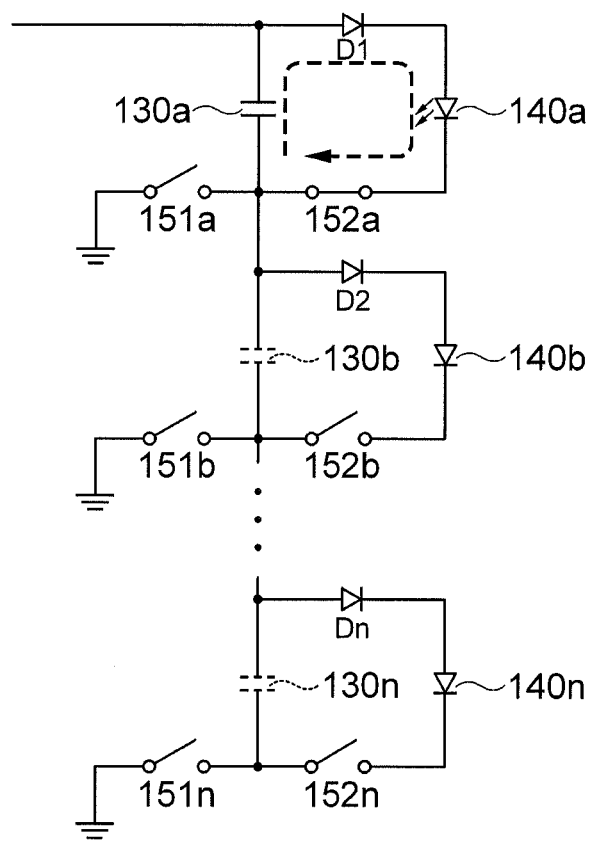
FIG. 6 is a diagram describing a switching operation of the switching control unit for driving an LED by discharging the voltage from the energy storage in a state in which the input voltage is low in the LED driving apparatus shown in FIG. 2.
Figure 7:
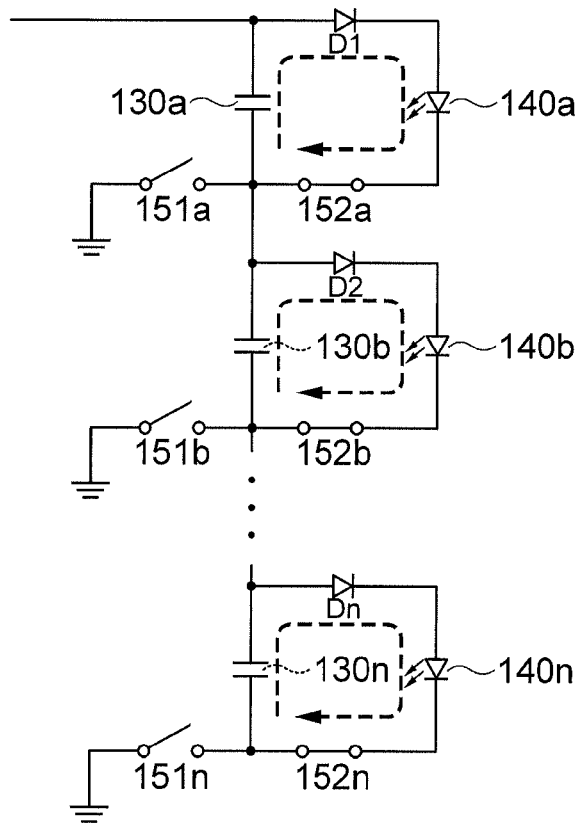
FIG. 7 is a diagram describing a switching operation of the switching control unit for driving the LED by discharging the voltage from the energy storage in a state in which the input voltage is high in the LED driving apparatus shown in FIG. 2.

FIG. 6 is a diagram describing a switching operation of the switching control unit for driving an LED by discharging the voltage from the energy storage in a state in which the input voltage is low in the LED driving apparatus shown in FIG. 2; and FIG. 7 is a diagram describing a switching operation of the switching control unit for driving the LED by discharging the voltage from the energy storage in a state in which the input voltage is high in the LED driving apparatus shown in FIG. 2.

Describing a case of FIG. 6, when the applied voltage is 50 V, the first reference voltage is 60 V, and the second reference voltage 110V, the controller 153 performs a control to output the second control signal CP2a connecting the second switch 152a using the comparator 153a, the control signal outputter 153b, and the reference signal outputter 153c, thereby connecting the first energy storage 130a and the first LED 140a to each other. Therefore, the voltage charged in the first energy storage 130a is discharged to the first LED 140a, such that the first LED 140a may be driven. That is, in a state in which the input voltage is low, the second switch 152a is connected so that the voltage is discharged only from the first energy storage 130a positioned at an uppermost portion.

Describing a case of FIG. 7, when the applied voltage is 120V, the first reference voltage is 60 V, and the second reference voltage is 110V, the controller 153 performs a control to output the second control signals CP2a to CP2n connecting all of the second switches 151a to 151n using the comparator 153a, the control signal outputter 153b, and the reference signal outputter 153c, thereby discharging the voltage from all of the first to n-th energy storages 130a to 130n. That is, in a state in which the input voltage is high, all of the second switches 152a to 152n are connected so that the voltage is discharged from all of the energy storages 130a to 130n.

Figure 8A:
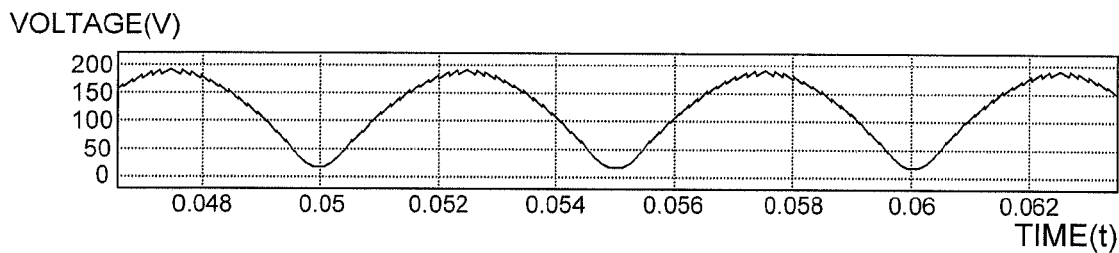
FIG. 8A is a waveform of alternate current (AC) voltage output from a power supply according to the exemplary embodiment of the present invention.
Figure 8B:
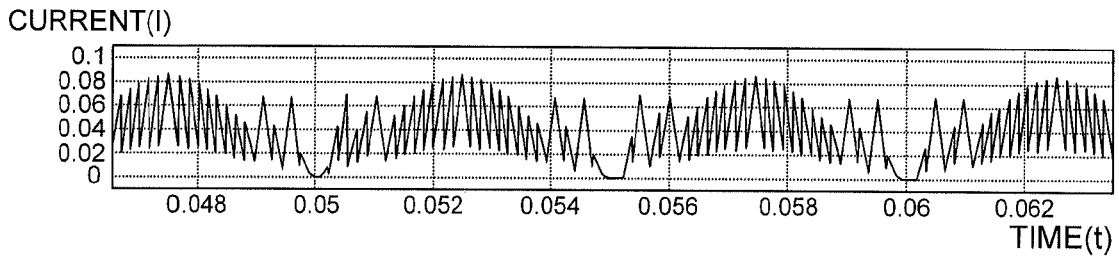
FIG. 8B is a waveform of current flowing in a first LED in the LED driving apparatus according to the exemplary embodiment of the present invention.
Figure 8C:
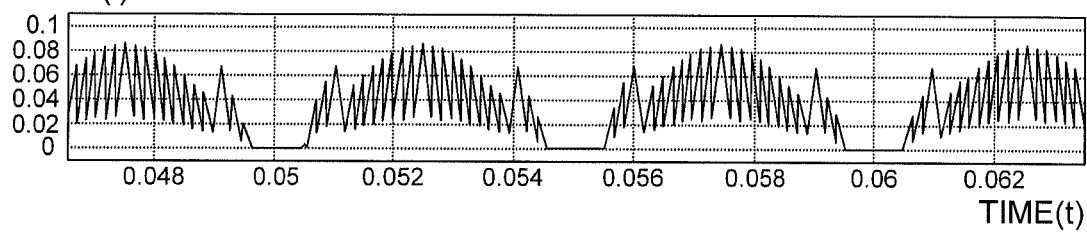
FIG. 8C is a waveform of current flowing in a second LED in the LED driving apparatus according to the exemplary embodiment of the present invention.
Figure 8D:
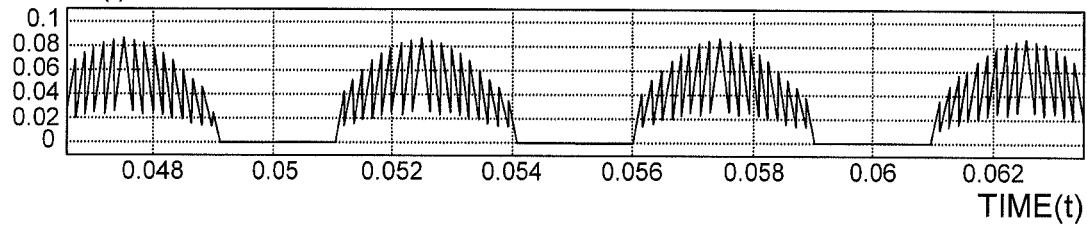
FIG. 8D is a waveform of current flowing in a third LED in the LED driving apparatus according to the exemplary embodiment of the present invention.

FIG. 8A is a waveform of AC voltage output from a power supply according to the exemplary embodiment of the present invention; FIG. 8B is a waveform of current flowing in a first LED in the LED driving apparatus according to the exemplary embodiment of the present invention; FIG. 8C is a waveform of current flowing in a second LED in the LED driving apparatus according to the exemplary embodiment of the present invention; and FIG. 8D is a waveform of current flowing in a third LED in the LED driving apparatus according to the exemplary embodiment of the present invention.

Referring to FIGS. 8A to 8D, an example of an LED driving apparatus including three energy storages and three LEDs will be described in the exemplary embodiment of the present invention.

When AC voltage as shown in FIG. 8A is output from the power supply 110, the AC voltage output from the power supply 110 is converted into DC voltage in a full-wave rectified sinusoidal wave form through the rectifying unit 120. Then, the full-wave rectified DC voltage is applied to the controller 153 to allow the controller 153 to output the first and second control signals CP1a to CP1c and CP2a to CP2c.

Therefore, the first and second switches 151a to 151c and 152a to 152c are selectively connected to selectively charge/discharge the voltage in/from the energy storage. Referring to FIGS. 8B and 8D, it may be appreciated that current continuously flows in the first LED 140a positioned at the uppermost portion regardless of the level of the applied DC voltage and a process in which current flows and then does not flows in the second and third LEDs 140b and 140c according to the level of the voltage output from the power supply 110 is repeated.

As described above, the LED driving apparatus according to the exemplary embodiment of the present invention selects the energy storages to be charged with the voltage and charges the voltage in the selected energy storages according to the level of the applied voltage, and selectively connect the selected energy storages to the LEDs to discharge the voltage from the energy storages accordingly, thereby making it possible to control brightness of light according to the number of LEDs that emits light. That is, the LED driving apparatus according to the exemplary embodiment of the present invention may control the brightness of the LED according to the level of the input voltage.

As described above, with the LED driving apparatus according to the exemplary embodiments of the present invention, it is possible to easily drive the LEDs without a converter by connecting each of the LEDs in parallel with each of a plurality of energy storage connected in series with each other and selectively charging/discharging the voltage in/from the energy storages according to the level of the applied voltage.

More specifically, the level of the applied voltage is sensed, the energy storages to be charged with the voltage are selected and charged with the voltage according to the level of the sensed voltage, and the selected energy storages are connected to the LED to supply the charged voltages to the LEDs when the charging is completed, thereby making it possible to automatically control the brightness of the LEDs according to the level of the applied voltage without a converter.

In addition, the current is consumed only in the comparator disposed in the switching control unit, thereby making it possible to increase efficiency of the LED driving apparatus.

Further, a transformer and a smoothing capacitor are not used, thereby making it possible to reduce volume of the LED driving apparatus and increase a lifespan thereof.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Accordingly, such modifications, additions and substitutions should also be understood to fall within the scope of the present invention.

What is claimed is:

1. A light emitting diode (LED) driving apparatus comprising:
    at least one energy storages connected in series with each other;
    a plurality of LEDs each connected in parallel with each of the energy storages; and
    a switching control unit selectively connecting the at least one energy storages according to a level of applied voltage to charge/discharge voltage in/from the selected energy storages and control driving of the LEDs by the charging/discharging operation.

2. The LED driving apparatus according to claim 1, wherein the switching control unit selectively connects the at least one energy storages with a ground (GND) according to the level of the applied voltage to selectively charge the voltage in the at least one energy storages.

3. The LED driving apparatus according to claim 1, wherein the switching control unit selectively connects the at least one energy storages and the LEDs to each other according to the level of the applied voltage to selectively discharge the voltage charged in the at least one energy storages, thereby driving the LEDs.

4. The LED driving apparatus according to claim 1, wherein the switching control unit includes:
    at least one first switches each connected between one end of each of the energy storages and a ground; and
    at least one second switches each connected between the other end of each of the energy storages and each of the LEDs.

5. The LED driving apparatus according to claim 4, wherein the switching control unit further includes a controller outputting first and second control signals for selectively operating the first and second switches according to the level of the applied voltage.

6. The LED driving apparatus according to claim 5, wherein the controller includes:
    a comparator comparing the applied voltage with a preset reference voltage; and
    a control signal outputter outputting the first and second control signals using the comparison result from the comparator.

7. The LED driving apparatus according to claim 5, wherein in the case in which the energy storages include sequentially arranged first to n-th energy storages and the LEDs include sequentially arranged first and n-th LEDs, when the level of the applied voltage is less than a preset first reference voltage, the switching control unit turns on a first switch corresponding to the first energy storage to charge the voltage in the first energy storage.

8. The LED driving apparatus according to claim 7, wherein when the charging of the voltage in the first energy storage is completed, the switching control unit turns on a second switch corresponding to the first energy storage to discharge the voltage charged in the first energy storage and apply the discharged voltage to the first LED, thereby driving the first LED.

9. The LED driving apparatus according to claim 8, wherein the first reference voltage is smaller than the second reference voltage.

10. The LED driving apparatus according to claim 5, wherein in the case in which the energy storages include sequentially arranged first to n-th energy storages and the LEDs include sequentially arranged first and n-th LEDs, when the level of the applied voltage is a preset second reference voltage or more, the switching control unit turns on a first switch corresponding to the n-th energy storage to charge the voltage in the first to n-th energy storages.

11. The LED driving apparatus according to claim 10, wherein when the charging of the voltage in the first to n-th energy storages is completed, the switching control unit turns on a second switch corresponding to the first to n-th energy storages to discharge the voltages charged in the first to n-th energy storages and apply the discharged voltages to the first to n-th LEDs, thereby driving the first to n-th LEDs.

12. The LED driving apparatus according to claim 1, wherein the energy storage is any one of a capacitor, a secondary battery, an ultracapacitor, and a supercapacitor.

* * * * *